United States Patent [19]
Sheppard et al.

[11] Patent Number: 5,739,594
[45] Date of Patent: Apr. 14, 1998

[54] CONTROLLER FOR AUTOMATIC TRANSFER SWITCHES

[75] Inventors: Kevin T. Sheppard, Chicago; Ronald L. Schultz, Northfield; Wayne C. Potempa, Willowbrook, all of Ill.

[73] Assignee: Zenith Controls, Inc., Chicago, Ill.

[21] Appl. No.: 597,930

[22] Filed: Feb. 7, 1996

[51] Int. Cl.⁶ .................................................. H02J 3/42
[52] U.S. Cl. ........................... 307/64; 307/66; 307/87; 307/126; 307/127; 307/141; 361/44; 361/45
[58] Field of Search ........................... 307/64, 66, 43, 307/141, 127, 126, 87; 361/66, 44, 45

[56] References Cited

U.S. PATENT DOCUMENTS

| Re. 30,295 | 6/1980 | Cleary et al. | 307/141 |
|---|---|---|---|
| 4,090,090 | 5/1978 | Johnston | 307/87 |
| 4,096,395 | 6/1978 | Bogel et al. | 307/64 |
| 4,145,617 | 3/1979 | Lee et al. | 307/43 |
| 4,189,649 | 2/1980 | Przywozny et al. | 307/64 |
| 4,231,029 | 10/1980 | Johnston | 340/658 |
| 4,384,213 | 5/1983 | Bogel | 307/64 |
| 4,405,867 | 9/1983 | Moakler et al. | 307/64 |
| 4,672,227 | 6/1987 | Lagree et al. | 307/64 |
| 4,879,624 | 11/1989 | Jones et al. | 361/65 |
| 4,894,796 | 1/1990 | Engel et al. | 364/900 |
| 5,182,464 | 1/1993 | Woodworth et al. | 307/87 |
| 5,210,685 | 5/1993 | Rosa | 307/64 |

*Primary Examiner*—Richard T. Elms
*Assistant Examiner*—Albert W. Paladini
*Attorney, Agent, or Firm*—Rudnick & Wolfe

[57] ABSTRACT

A microprocessor controlled automatic transfer switch is provided with an improved voltage sensing scheme which utilizes an open-delta transformer and a control routine for determining voltage level or phase loss. The invention requires only two transformers for sensing three-phase power. An actuator protection feature is also provided to limit the duration of power applied to and to protect the actuator solenoids on the automatic transfer switch. Also provided are improved diagnostic annunciation features which provide specific information regarding switch position and sensing element and/or actuator malfunction.

5 Claims, 10 Drawing Sheets

| CONDITION | FLASH NORMAL POSITION LIGHT | FLASH EMERGENCY POSITION LIGHT |
|---|---|---|
| ATS IN NORMAL POSITION AFTER TWO ATTEMPTS TO TRANSFER CONDITIONS FOR NORMAL TO EMERGENCY TRANSFER STILL EXIST | ✓ | |
| ATS IN EMERGENCY POSITION AFTER TWO ATTEMPTS TO TRANSFER CONDITIONS FOR EMERGENCY TO NORMAL TRANSFER STILL EXIST | | ✓ |
| ATS FAILED TO TRANSFER AND IS NOT IN A DEFINED POSITION (LIMIT SWITCHES MAY BE UNPLUGGED) | ✓ | ✓ |

TWO POSITION ATS DIAGNOSTIC ANNUNCIATION

FIG. 7A

| CONDITION | FLASH NORMAL POSITION LIGHT | FLASH OPEN POSITION LIGHT | FLASH EMERGENCY POSITION LIGHT |
|---|---|---|---|
| ATS IN NORMAL POSITION AFTER TWO ATTEMPTS TO TRANSFER CONDITIONS FOR NORMAL TO EMERGENCY TRANSFER STILL EXIST | ✓ | | |
| ATS IN EMERGENCY POSITION AFTER TWO ATTEMPTS TO TRANSFER CONDITIONS FOR EMERGENCY TO NORMAL TRANSFER STILL EXIST | | | ✓ |
| ATS IN OPEN POSITION AFTER TWO ATTEMPTS TO TRANSFER TO NORMAL OR EMERGENCY POSITION CONDITIONS FOR TRANSFER STILL EXIST | ✓ | ✓ | |
| ATS IS BETWEEN THE NORMAL AND OPEN POSITIONS | ✓ | ✓ | |
| ATS IS BETWEEN THE OPEN AND EMERGENCY POSITIONS | | ✓ | ✓ |
| ATS IS NOT IN A DEFINED POSITION ACCORDING TO THE LIMIT SWITCH CONTACTS (LIMIT SWITCHES MAY BE UNPLUGGED) | ✓ | ✓ | ✓ |

THREE POSITION ATS DIAGNOSTIC ANNUNCIATION

FIG. 7B

CONTROLLER FOR AUTOMATIC TRANSFER SWITCHES

BACKGROUND

The invention relates generally to power switching devices and more specifically to a device for controlling the operation of an Automatic Transfer Switch (ATS).

An ATS provides a continuous source of power for critical loads by automatically transferring from a normal power source to an emergency power source when the normal power source falls below preset limits. ATS are in widespread use in hospitals, military installations, industrial sites and commercial buildings where even brief power interruptions can be very costly.

Typical ATS devices comprise a plurality of mechanical switching components whose operation is controlled to minimize the interruption experienced by the load during switching. Control of the switching components occurs through a series of sensing relays, transformers and actuators, such as solenoids or linear motors to facilitate timely transfer from normal to emergency power.

Prior ad controllers typically require three transformers for voltage and phase sensing in a three-phase power scheme. This results in an added expense and manufacturing effort since one transformer and the associated support hardware, i.e., connectors and circuitry, for each phase must be installed in the ATS. There is a desire to reduce the manufacturing cost of the ATS while retaining the voltage and phase sensing capabilities for three-phase power.

Another problem with prior art ATS devices concerns the potential for the controller to damage the electric operator or actuators which provide the mechanical motion to effect the transfer from normal to emergency power or vice versa. Dependable operation of the switch actuators is critical to the operation of the ATS. Replacement of these actuators, which typically comprise a solenoid element, always requires disconnection of the line voltage for safety reasons. In prior art devices, solenoid actuators are energized until the controller senses that the switching component has been moved to its desired position. This is usually accomplished with limit switches which provide a signal to the controller that switching is complete. Power to the solenoid energization is then discontinued by the controller. Prior art control schemes may result in damage to the solenoid actuator in the event of a limit switch malfunction. For example, when the solenoid is energized, but the mechanical limit switch fails to actuate because of misalignment or malfunction, the solenoid will be energized for a prolonged period of time. Prolonged energization of the solenoid may result in permanent damage to the solenoid and require replacement and disconnection of the ATS from the power feed. This necessitates disconnection of the power sources and an interruption in power to the load.

Yet another problem concerns the inability of prior art controllers to pinpoint problems in the ATS. This results in inefficient troubleshooting by personnel which may cause loss of power to the load. The diagnostic systems of prior art controllers lack the capability to specifically annunciate problems or malfunctions in the operation of the ATS. This leaves operating or maintenance personnel ill-informed to repair the malfunction and may result in unnecessary expenditure of labor and parts to correct the problem. There is thus desired an ATS which provides more specific indication of diagnostic symptoms than prior art devices.

SUMMARY OF THE INVENTION

The present invention improves upon the prior art by providing an ATS controller which utilizes an open-delta transformer arrangement. Voltage and phase loss are determined from two, rather than three, transformers. A control routine is executed by the microprocessor to determine voltage levels and phase loss according to predetermined conditions. The invention also provides an actuator protection feature which limits the duration of the energization of the solenoid actuators to prevent damage. The invention provides more specific annunciation of diagnostics than prior art controllers by utilizing a display panel and control routines which detect switch positions, malfunctions in the transfer switch, and misadjustment of the limit switches.

BRIEF DESCRIPTION OF THE DRAWINGS

FIGS. 7A and 7B are tables indicating the diagnostic symptoms annunciated according to a preferred embodiment of the invention.

DETAILED DESCRIPTION

Figure 1:
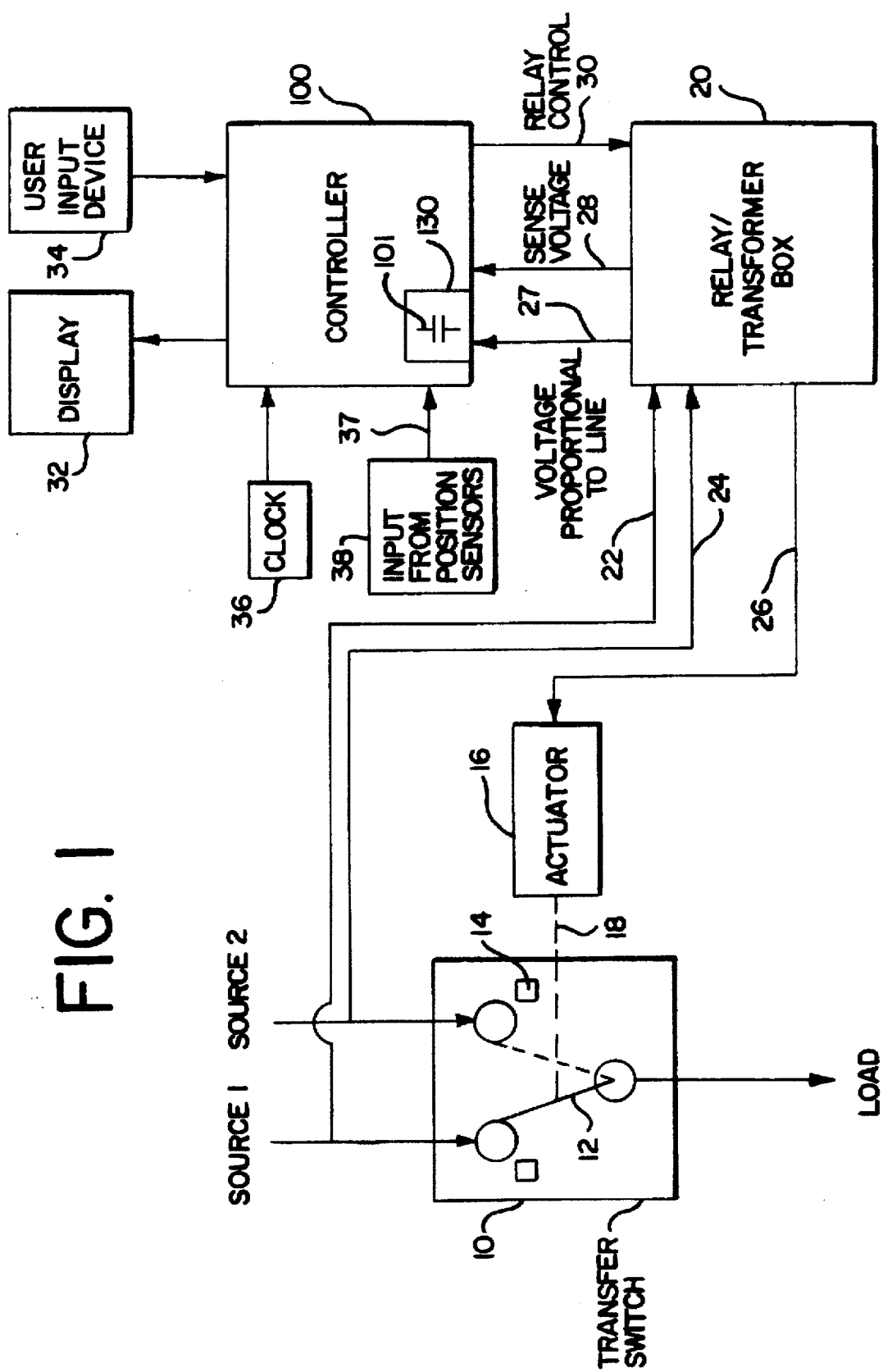
FIG. 1 is a block diagram of an automatic transfer switch and a controller according to a preferred embodiment of the invention.

Referring to FIG. 1, an ATS according to the present invention comprises a transfer switch assembly 10 which includes a switching assembly 12 for switching between a pair of input power sources SOURCE 1 and SOURCE 2. A single power distribution network is represented by the LOAD. Switching assembly 12 is movable from a normal position in which SOURCE 1 is connected to the LOAD and a emergency position, shown in dotted lines, in which SOURCE 2 is connected to the load. Position sensors 14, which may comprise limit switches, provide a signal indicative of the position of the switching assembly 12. Actuator 16 operates on switching assembly 12 via a linkage 18. Actuator 16 may comprise a solenoid or a linear motor provided with a mechanical linkage adapted to move switching assembly 12 in a known manner.

It is to be understood that the embodiment shown represents a two position ATS. The present invention is equally functional in ATS'incorporating three position switches which provide for an open position between the normal and emergency positions in order to provide for a delay during the switching action. Both two and three position ATS devices are known in the art and a detailed description of such is not necessary for a complete understanding of the present invention. It is also to be understood that the embodiment shown depicts the ATS in schematic form where the switching elements are represented only functionally. Circuit breaker elements may be incorporated at each power input as an alternative to a movable switch assembly 12 and actuated using appropriate respective actuators.

Relay/transformer box 20 comprises a series of transformers for sensing voltages of the power inputs and a number of relays for energizing actuator assembly 16. The voltages of the power inputs are provided on lines 22 and 24 and sensed using a transformer arrangement to be described below. SOURCE 1 typically includes a three-phase power source and SOURCE 2 a three-phase power source. Relays provide a means for energizing actuator 16 via line 26. The use of relays and transformers is conventional in the ATS field. However, as will be described, the present invention provides an improved voltage sensing configuration which represents a departure from prior art voltage level and phase loss sensing devices in an ATS Relay/transformer box 20 provides a voltage proportional to the line voltage input on line 27 to controller 100 as well as a sensing voltage on line 28. A relay control signal is provided from controller 100 on line 30 to the relay/transformer box 20. A display device 32 is connected to controller 100 to display the status of the ATS operation in a manner to be explained below. User input device 34 communicates with controller 100 and may comprise a keypad, switch inputs, or potentiometer inputs for adjusting the various functions of the controller 100. An internal clock 36 is also provided for timing features on the controller 100. Input from position sensors 14, represented by block 38, is provided to the controller 100 on line 37.

A supercapacitor 101, preferably having a capacitance of about 3.3 Farad is incorporated into the power supply 130 for controller 100. Supercapacitor 101 is normally charged by source 1. It provides power to microprocessor (FIG. 2) when a power source is unavailable.

Figure 2:
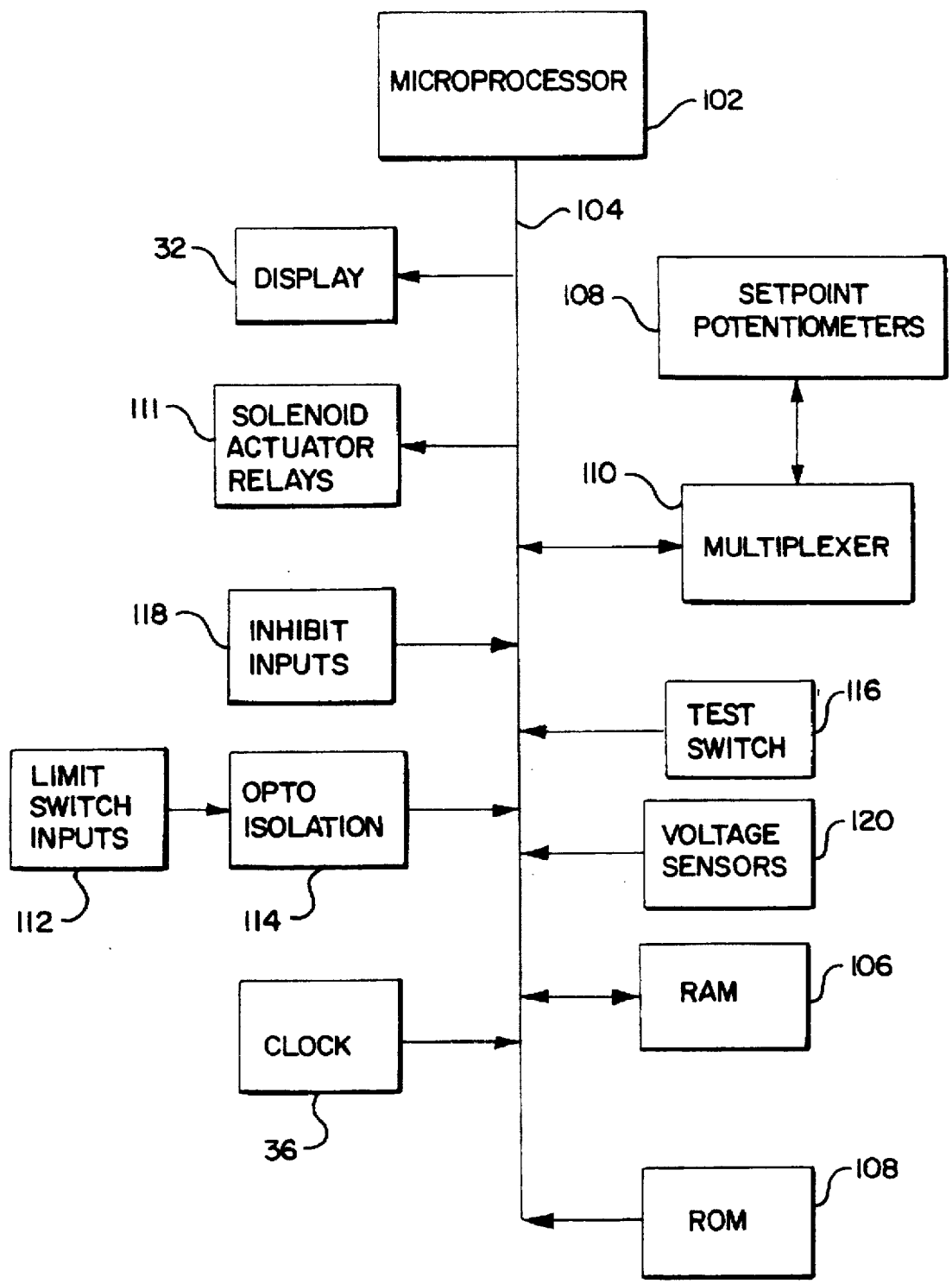
FIG. 2 is a block diagram illustrating a hardware configuration of an ATS controller according to a preferred emodiment of the invention.

FIG. 2 represents a hardware configuration of controller 100 (FIG. 1) and the control elements associated therewith which is suitable for implementing the present invention. The controller comprises a Microprocessor 102 which communicates through an electronic bus, represented by line 104, with RAM 106 and ROM 108 which provide the control algorithm for operation of the controller 100. Display 32, actuator relays 111 and clock 36 communicate with bus 104. Setpoint potentiometers, represented by block 108, communicate through multiplexer 110 and bus 104 with microprocessor 102. Setpoint potentiometers 108 permit an operator to alter the pick-up and drop out voltages and frequencies, as well as the time delays associated with operation of the ATS in switching from normal to emergency power. Potentiometers 108 are multiplexed to microprocessor 102 in a known manner such that microprocessor 102 is provided with the setting of each potentiometer on bus 104. Limit switch inputs, represented by block 112, are the inputs from position sensors 14 to 38 (FIG. 1) and communicate with bus 104 through an opto isolation device 114 which allow the relatively large voltage signals from the limit switches to be conveyed to and from microprocessor 104 while isolating the microprocessor from the limit switch voltages. Voltage sensors 120 also communicate with bus 104 to provide a signal indicative of the voltage on the normal and emergency power input lines. Test switch 116 is provided to initiate a self-test routine for the ATS. Inhibit inputs 118 are also provided to inhibit certain controller functions.

Figure 3:
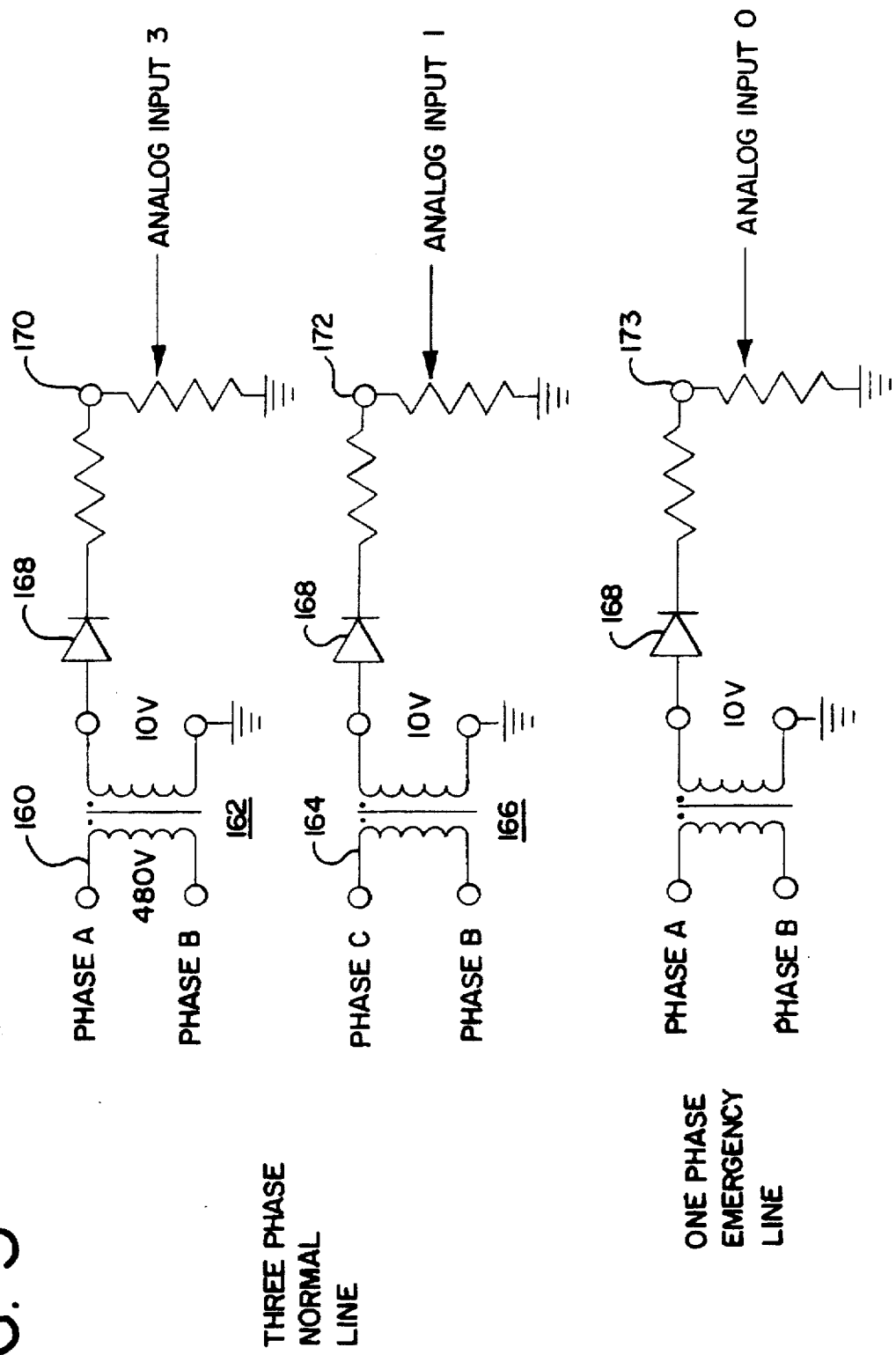
FIG. 3 is a schematic diagram illustrating a voltage sensing feature according to a preferred embodiment of the present invention.

Referring to FIG. 3, the voltage and frequency sensing circuit for the three phase normal line input comprises a pair of transformers in an open-delta arrangement. These transformers are located in the relay/transformer box 20 (FIG. 1) and are connected to the line voltage. Primary windings 160 of a first transformer 162 are connected to the phase A and phase B power. Similarly, phase C and phase B are inputs to a second transformer 166. Primary windings 160 and 164 are subject to a potential of up to 600 VAC, typically 480 VAC. Secondary windings are configured to provide a 10V signal. Diodes 168 provide a half-wave rectified signal at terminals 170, and 172, the signals being proportional to the A-B and C-B phase line voltages.

In accordance with the present invention, a third transformer is unnecessary for sensing the voltage between phases A and C. The A-C phase is determined using the analog inputs 1 and 3 which provide analog signals to microprocessor, which preferably comprises a chip similar to the Motorola 68HC711. The half-wave rectified signals associated with the A-B phase and the C-B phase, which preferably are provided as 5.5 peak voltage signals (nominal) are received via sensors 120 and analyzed by the microprocessor to determine the phase angle between the A-B phase and the C-B phase and the loss of the A-C phase voltage is detected when this phase angle drops below a predetermined value, typically 60 degrees. That is, when the phase difference becomes less than 60 degrees, the controller determines that a voltage loss has occurred and implements the appropriate operation of the ATS. The A-C phase voltage loss is thus determined algorithmically using the analog signals to the microprocessor, instead of using a third transformer. Loss of the A-B phase voltage and the C-B phase voltage are determined by sensing a reduction in the amplitude, typically to 80% or less of the nominal value, of the A-B and C-B phase voltage signals.

As is known in this art it is necessary to monitor all three phases because some fault modes will cause only one of the three phases to fail. In such cases, it is possible for devices, such as motors, connected to the three phase source to keep operating but to draw excessive current.

Figure 4:
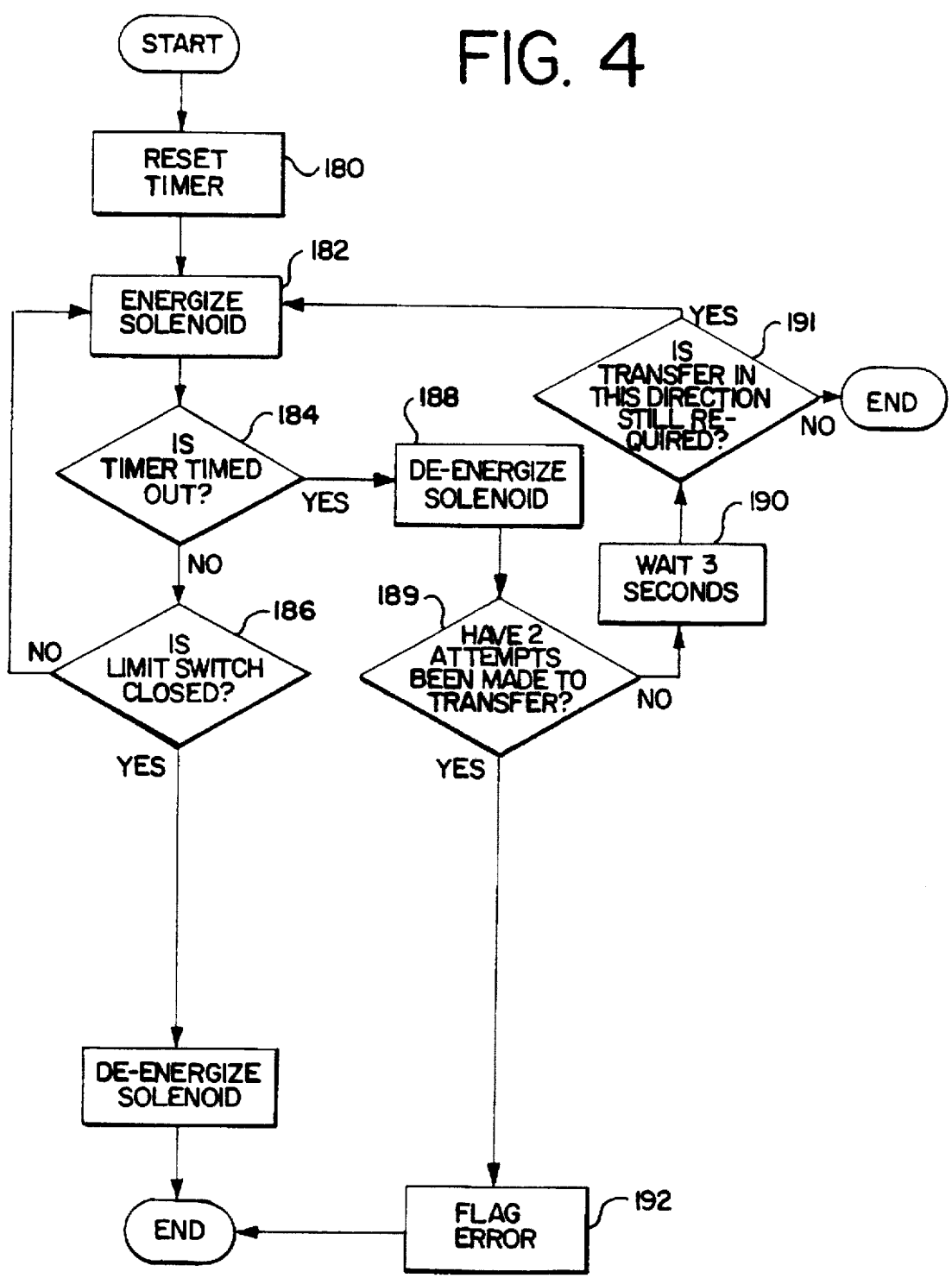
FIG. 4 depicts software flow diagram illustrating the operation of an actuator protection feature of an ATS controller according to a preferred embodiment of the invention.

Referring to FIG. 4, the actuator protection feature of the present invention is implemented in a software routine which prevents prolonged energization of the actuator 16 (FIG. 1). The routine begins with a resetting of the timer at 180. The timer is set for a duration corresponding to the maximum safe energization period for actuator 16, typically 500 milliseconds (which is preferably five times the duration of a typical successful energization time). The actuator (solenoid) is energized at 182.

Referring also to FIGS. 1 and 2, energization of the solenoid is accomplished by a signal from microprocessor 102 which is provided to the solenoid actuator relay(s) 110 (FIG. 1). Following the initial energization of the solenoid, the routine checks the status of the timer at 184. If the timer is not timed out, the routine checks at 186 if the limit switch has been closed which will indicate that the transfer of the switch from one position to the other has been completed. If the limit switch is not closed, energization of the solenoid continues until the timer times out. If limit switch closure is not detected before the timer times out, the solenoid is de-energized at 188. The program determines if this is the second time that energization has been attempted at 189. If only one attempt has been made to energize the solenoid, the routine executes a delay of about 3 seconds, determines if transfer is still required at 191, and then branches back to 182 to conditionally energize the solenoid again as described above. If two attempts have been made, 189 will result in a branch to error flag 192, which represents one of the diagnostic annunciation features of the invention, to alert the operator that the transfer was unsuccessful and the routine will end.

Figure 5A:
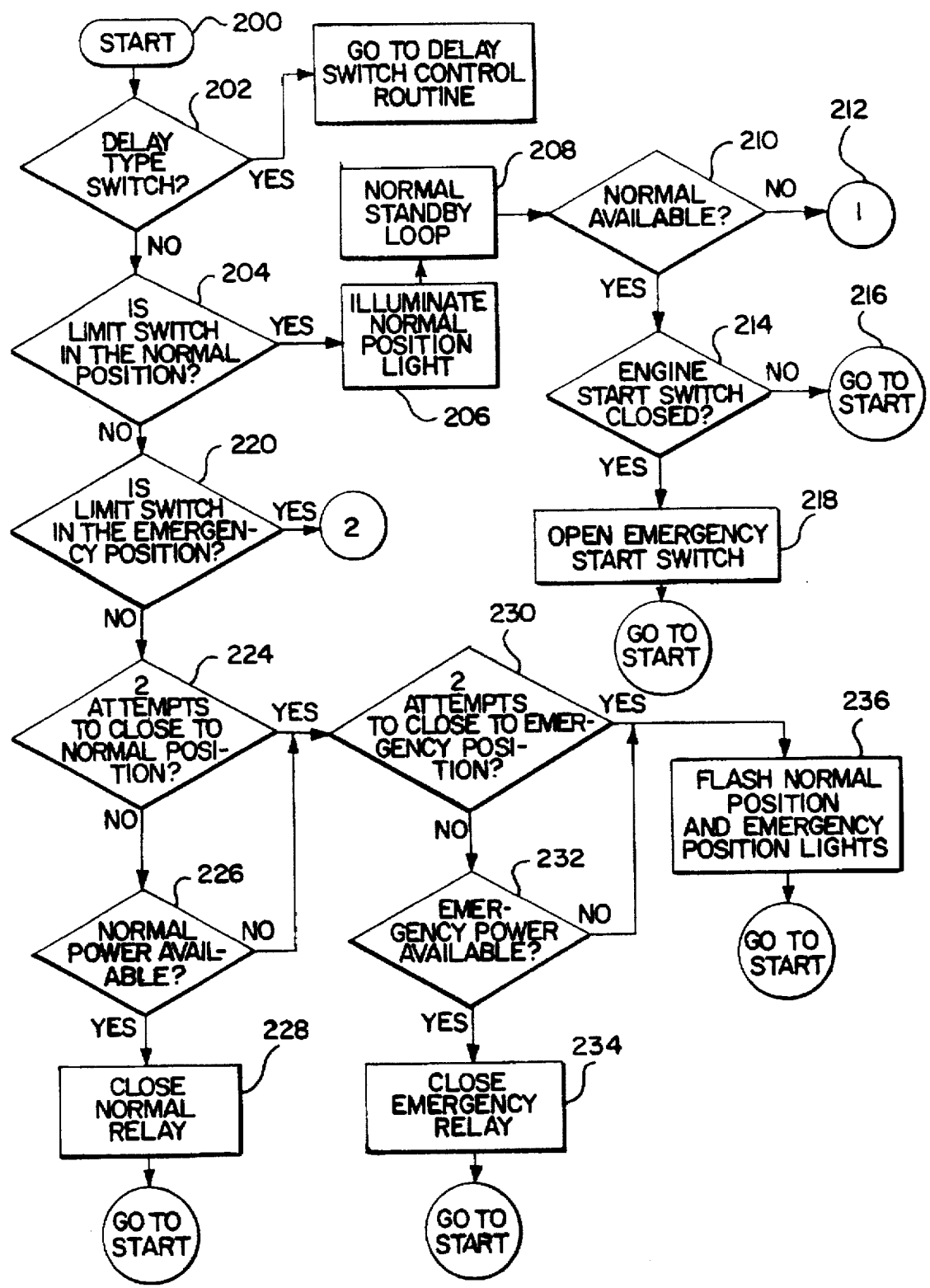
FIGS. 5A-C depict software flow diagrams for the operation and diagnostic annunciation of an ATS controller according to a preferred embodiment of the invention.
Figure 5B:
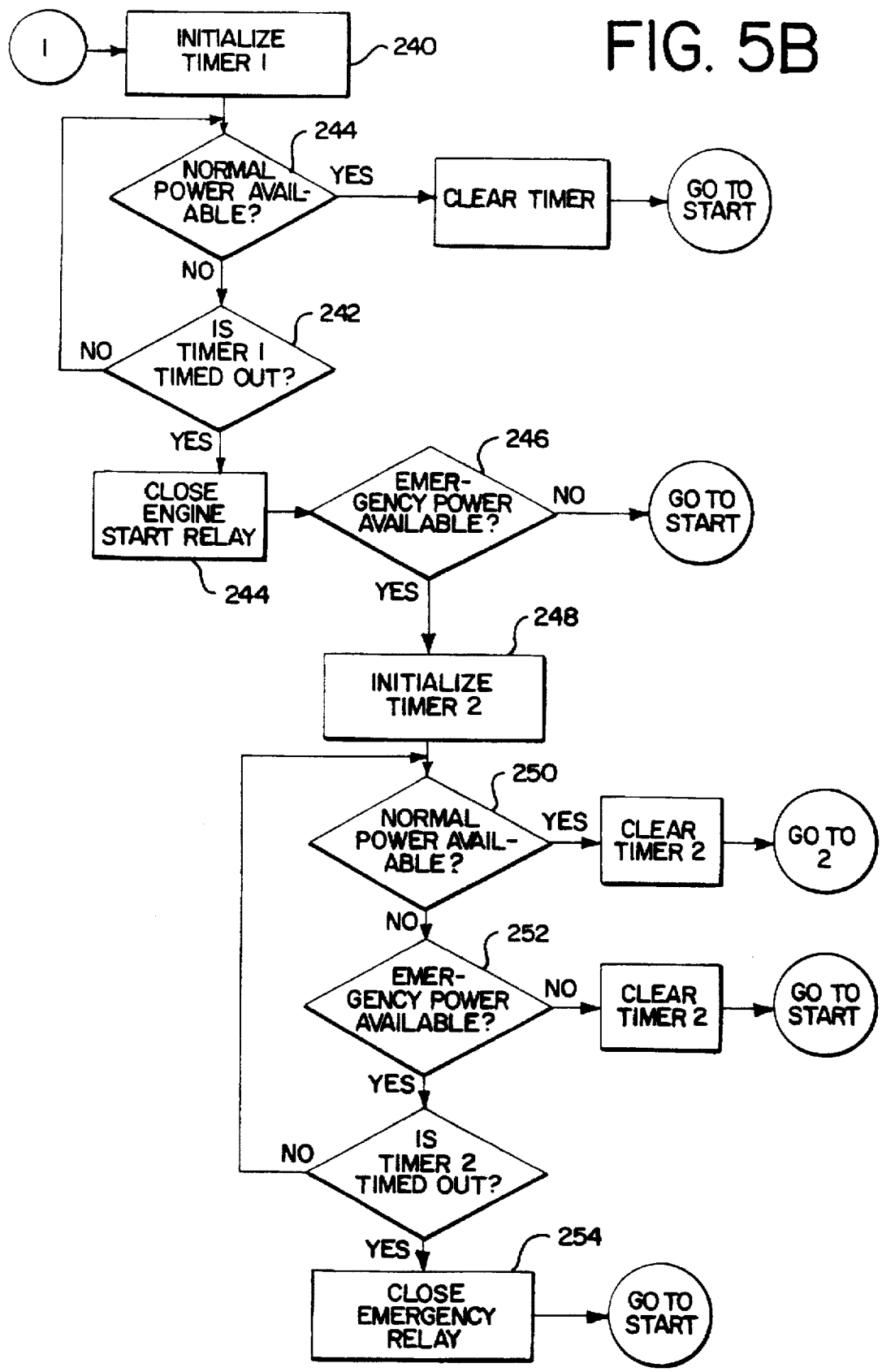
Figure 5C:
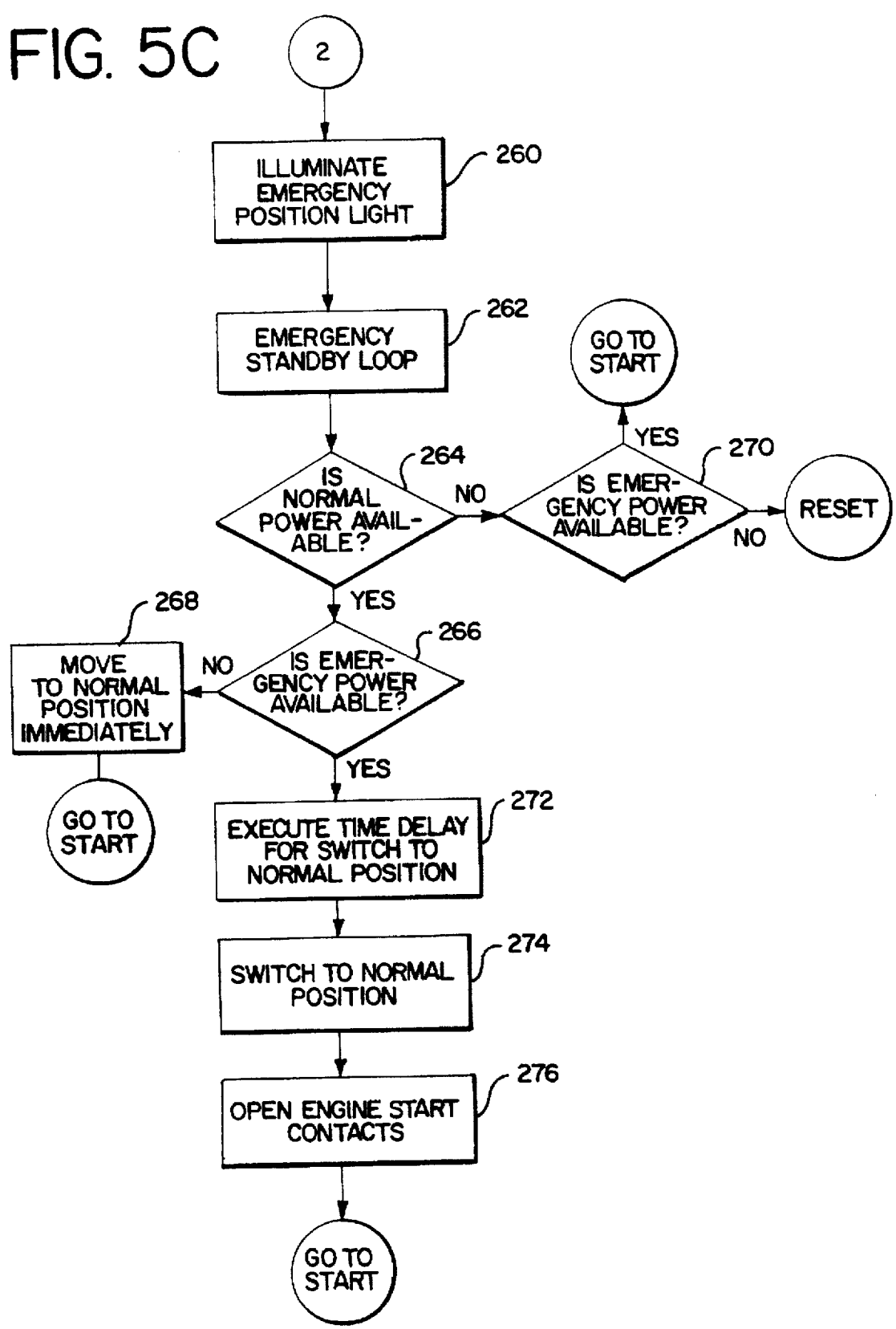

The general operation of the controller as well as the diagnostic annunciation features according to the present invention is illustrated by the flow diagrams of FIGS. 5A–C which will enable those of ordinary skill to implement the invention using any conventional computer programming language. The control routine begins at 200. A determination is made at 202 as to what type of ATS is being controlled—either a two—position or a three-position delay type ATS. Three position ATS's incorporate a delay feature in which the transfer switch remains in an open position for a predetermined time in order to permit large inertia motors, which generate a back EMF when de-energized, sufficient time for the back EMF to decay. If a two position ATS is sensed, the routine checks if the limit switch indicates the normal position of the ATS at 204. If the normal position is sensed, the NORMAL light is illuminated, 206, and a normal standby loop, 208 is executed in which the control routine monitors normal power and awaits normal power failure or test switch request to start the transfer to emergency sequence.

Availability of normal power is checked at 210 using the voltage sensing scheme described above. If normal power is not sensed, the routine branches at 212 to the emergency power switching routine shown in FIG. 5B and described below. If normal power is sensed, a check is made as to whether the engine start switch is closed. In this connection, it should be noted that the routine may have already initiated the emergency switching routine but normal power may have become available, making the emergency switching unnecessary. In such a case, the emergency start switch for the generator will be opened at 218 and the routine returns to START. If the start switch has not yet been closed, the routine returns to START.

If 204 indicates that the ATS is not in the normal position, a check is made at 220 as to whether the limit switch indicates that the ATS is in the emergency position. If so, the routine branches to the emergency power routine shown in FIG. 5C and described below. If not, the routine checks the status as to whether two attempts have been made to close to the normal position at 224. If not, availability of normal power is checked at 226 and a command issued to close the normal relay at 228 before the routine returns to START. If normal power is not available at 226, or if two unsuccessful attempts have already been made to command the normal relay to close and emergency power is available, the routine attempts to close to the emergency position, beginning at 230. If two attempts to close the emergency relay have not yet been made, availability of emergency power is checked at 232 and a command to close the emergency power relay is made at 234 before the routine returns to START. If emergency power is not available or if two attempts to close the emergency relay have failed, the normal position and emergency position LED's are illuminated at 236 before the routine returns to START. The flashing LED's thus indicate that neither side of the ATS is closed and that the ATS has attempted to switch to the appropriate power source two times unsuccessfully. This may indicate a problem with the mechanics of the ATS, including misalignment of the limit switch sensors with the switching components.

Referring to FIG. 5B, the emergency switching routine begins with an initialization of TIMER1 at 240 which represents the duration that normal power must be unavailable before switching to the emergency power routine. The routine loops around at 242 until the timer has timed out and checks if normal power has become available at 244. If it has, the timer is cleared and the routine returns to START. If the timer expires before normal power becomes available, the engine start relay is closed at 244. The routine begins checking for the availability of emergency power at 246. If emergency power is not yet available, the routine returns to START where, via the routine described above with reference to FIG. 5A, the emergency power relay will be closed when emergency power becomes available via blocks 232 and 234. If emergency power is available at 246, a second timer TIMER 2 is initialized at 248. TIMER 2 is cleared if normal power is detected at 250 or if emergency power is not yet available at 252. If emergency power is available, the emergency relay will be closed at 254 after TIMER 2 has expired.

Referring to FIG. 5C, the emergency switching routine begins with illumination of the emergency position LED at 260. An emergency standby loop is executed at 262 wherein the continuous availability of emergency power is checked. Availability of normal power is checked at 264 and if detetected while emergency power is not available at 266, the ATS is instructed to switch immediately to the normal position at 268 and return to START. If normal power is not available at 264 while emergency power is available, the routine returns to START at 270. If neither normal nor emergency power is available, the routine initiates a RESET command at 272 whereby all timers are cleared and returns to START. If normal power is available and emergency power is available at 266, the routine initiates the sequency to switch from emergency to normal power after a delay is executed at 272. The switch to normal occurs at 274 and the engine start contacts are opened at 276 to turn off the generator engine. The routine then returns to START.

Figure 6:
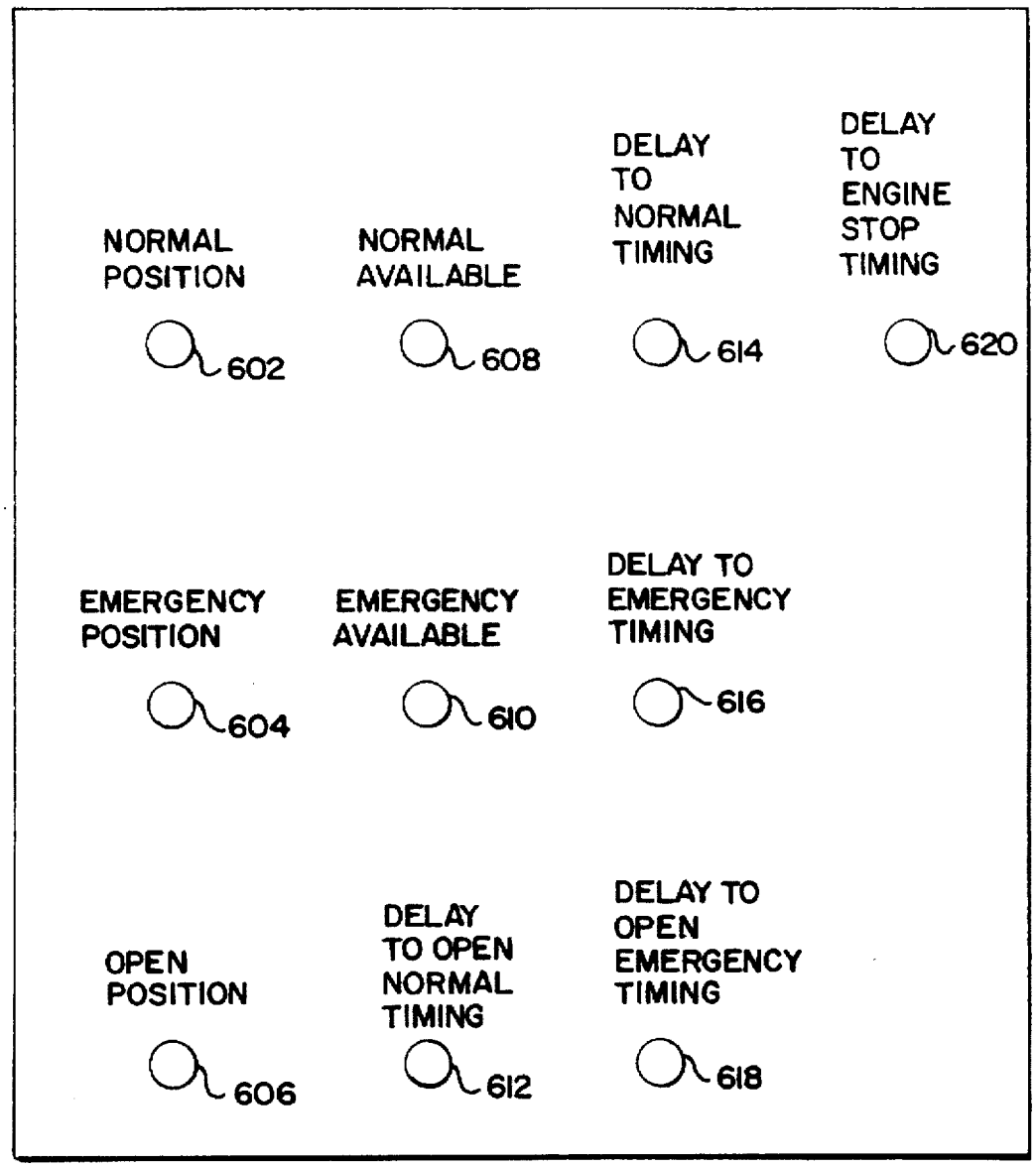
FIG. 6 illustrates an indicator panel for an ATS according to a preferred embodiment of the invention.

Referring to FIG. 6, a display panel 32 according to the present invention includes LED indicators for diagnostic annunciation for the ATS. Position indicators 602, 604 and 606 indicate the position of the transfer switches. Open position indicator 606, as well as indicators 612 and 618, are applicable to the operation of the controller for a delayed transition or three-position ATS device. Indicators 608 and 610 display the availability or unavailability of normal or emergency power. Delay indicators 612–620 indicate whether the appropriate control timers are operating. FIGS. 7A and 7B, set forth the diagnostic conditions and annunciation for both two and three position ATS devices using the LED position indicators of the control panel illustrated in FIG. 6.

There has thus been disclosed a new and useful control device for an automatic transfer switch. The above description is intended to illustrate rather than limit the scope of protection desired. Those of ordinary skill will recognize that various modifications may be made to the embodiments disclosed above without departing from the scope of the invention which is set forth in the appended claims.

What is claimed is:

1. An automatic transfer switch for selectively energizing a load from either a three-phase normal or a three-phase emergency power source comprising:
   a) switching means associated with the power sources for selectively connecting either the normal or emergency power source to the load;
   b) means for actuating said switching means for movement between the normal and emergency positions;
   c) control means for controlling the actuating means including:
      i) an open-delta transformer pair connected to the normal power source for sensing two of the phase voltages to sense loss of the two phase voltages;
      ii) processor means for determining the loss of the third of the phase voltages based on the phase difference between said two phase voltages, said control means energizing said actuating means in response to loss of any one of said phase voltages.

2. The apparatus of claim 1, wherein the processor means includes means for limiting the time that the actuating means is energized.

3. The apparatus of claim 1, wherein the processor means includes means for determining the loss of the third of the phase voltages by determining when the phase difference drops below a predetermined value, the apparatus further comprising means for adjusting the predetermined value.

4. The apparatus of claim 1, further comprising means for providing power to said processor means when both of said power sources are interrupted.

5. The transfer switch of claim 1 where said control means further comprises means for limiting the time that said actuating means is energized.

* * * * *